United States Patent [19]
Otte

[11] Patent Number: 5,018,351
[45] Date of Patent: May 28, 1991

[54] HYDROMECHANICAL DRIVE

[75] Inventor: Erhard Otte, Bünde, Fed. Rep. of Germany

[73] Assignee: Gerhard Klemm Maschinenfabrik GmbH & Co., Bielefeld, Fed. Rep. of Germany

[21] Appl. No.: 286,404

[22] Filed: Dec. 16, 1988

[30] Foreign Application Priority Data

Dec. 16, 1987 [DE] Fed. Rep. of Germany ....... 3742569

[51] Int. Cl.⁵ ............................................ F16D 31/02
[52] U.S. Cl. ......................................... 60/448; 60/449; 60/489; 60/490; 60/491; 60/492
[58] Field of Search ................. 60/437, 438, 325, 489, 60/490, 491, 492, 448, 449

[56] References Cited

U.S. PATENT DOCUMENTS

| | | | |
|---|---|---|---|
| 3,693,503 | 9/1972 | Ruhl et al. | 60/491 |
| 4,345,436 | 8/1982 | Johnson | 60/428 |
| 4,354,420 | 10/1982 | Bianchetta | 60/426 |
| 4,531,431 | 7/1985 | Dreher et al. | 60/438 |
| 4,644,749 | 2/1987 | Somes | 60/489 |
| 4,712,376 | 12/1987 | Hadank et al. | 60/428 |
| 4,745,748 | 5/1988 | Hayashi et al. | 60/489 |
| 4,768,339 | 9/1988 | Aoyagi et al. | 60/427 |
| 4,793,138 | 12/1988 | Baumgartner | 60/491 |

FOREIGN PATENT DOCUMENTS

| | | | |
|---|---|---|---|
| 0073265 | 5/1982 | Japan | 60/492 |
| 1425805 | 2/1969 | United Kingdom | 60/490 |

*Primary Examiner*—John T. Kwon
*Assistant Examiner*—Thomas Denion
*Attorney, Agent, or Firm*—Peter K. Kontler

[57] ABSTRACT

A hydromechanical drive wherein a prime mover drives an input shaft which, in turn, can drive a coaxial output shaft by way of a clutch or transmission having one or more axial piston pumps. The pressure and/or rate of fluid flow in the pump or pumps is adjustable by one or more valves or by one or more tiltable wobble plates in response to signals from one or more adjusting devices which receive signals from an electronic control circuit. The latter further receives signals from tachometer generators which monitor the RPM of the input and output shafts, from a gauge which monitors the pressure in the pump or pumps, from the valve or valves, or from the adjusting devices(s) for the tiltable wobble plate(s).

30 Claims, 7 Drawing Sheets

HYDROMECHANICAL DRIVE

BACKGROUND OF THE INVENTION

The invention relates to improvements in hydromechanical drives, and more particularly to improvements in hydromechanical drives of the type wherein a prime mover can transmit torque to one or more driven components (e.g., to the wheels of a motor vehicle) by way of a hydromechanical clutch, a hydromechanical transmission or an analogous torque transmitting unit.

German Auslegeschrift No. 19 45 440 of Heyl discloses a hydrostatic axial piston transmission with internal torque division. The arrangement is such that the output element can be selectively coupled to the input element or to a rotary housing through the medium of an intermediate gearing. The transmission further comprises a braking system which can be used to vary the RPM of the output element or the RPM of the intermediate gearing. A drawback of the transmission of Heyl is that it must rely on the action of the braking system which is subject to extensive wear. Moreover, the intermediate gearing can be set only to establish or to interrupt a driving connection between the input element and the output element; changes in speed must be effected exclusively by the braking system.

German Utility Model No. 74 25 346 of Moeller & Neumann discloses a differential which employs a hydrostatic motor, particularly a radial piston machine, with an inlet and an outlet for the hydraulic fluid. The motor has a rotor as well as a rotary housing; one of these rotary parts is connected with the input element and the other rotary part is connected with the output element of the differential. Each of the rotary parts can receive hydraulic fluid at a variable rate. The source of pressurized fluid is a hydraulic pump which can supply fluid at a variable rate and determines the RPM of the hydrostatic motor when the differential is called upon to superimpose a second RPM upon a basic RPM. The differential further employs a turnable joint which serves to supply pressurized fluid as well as to provide a path for return flow of the fluid. The means for supplying and returning hydraulic fluid is an open system which is driven by an axial piston pump and is equipped with a pressure relief valve. There is a vessel which supplies fluid to the pump and a vessel for collection of returning fluid. A drawback of the just described differential is that the hydraulic system merely constitutes an auxiliary unit and that it is not possible to accurately regulate the entire RPM range of the differential.

German Offenlegungsschrift No. 36 19 671 of Hiramatsu discloses a hydrodynamic transmission and a control circuit which receives signals denoting the RPM of the input and output elements and generates signals which are used to control the operation of a mechanical clutch which is connected in parallel with the hydrodynamic transmission.

OBJECTS OF THE INVENTION

An object of the invention is to provide a hydromechanical drive which can transmit torque from a prime mover to one or more driven units at an accurately controllable rate.

Another object of the invention is to provide a hydromechanical drive wherein the transmission of torque can be regulated in dependency upon all parameters which warrant consideration during transmission of torque from a prime mover to one or more driven units, for example, from the engine to the wheels of a motor vehicle.

A further object of the invention is to provide a novel and improved fluid flow machine (such as an axial or radial piston pump) for use in the above outlined drive.

An additional object of the invention is to provide a novel and improved hydraulic motor for use in the above outlined drive.

Still another object of the invention is to provide a novel and improved hydraulic pump-motor combination for use in the above outlined drive.

A further object of the invention is to provide a novel and improved method of influencing the transmission of torque between a prime mover and one or more driven units.

An additional object of the invention is to provide novel and improved means for regulating the transmission of torque in a hydromechanical drive of the above outlined character.

Another object of the invention is to provide a hydromechanical drive wherein the transmission of torque from a rotary input element to a rotary output element can be effected by way of a clutch or by way of a transmission.

A further object of the invention is to provide a hydromechanical drive wherein the circulation of hydraulic fluid is controlled in a novel and improved way.

An additional object of the invention is to provide novel and improved means for regulating the output of an axial piston pump which is used in the above outlined drive.

Another object of the invention is to provide a novel and improved system for regulating the inclination of the tilting box or block in an axial piston pump or motor as a function of one, two or more parameters.

SUMMARY OF THE INVENTION

The invention is embodied in a hydromechanical drive, particularly a clutch or transmission. The improved drive comprises a rotary input element which is connectable with an element of a prime mover (e.g., with the crankshaft of an internal combustion engine in a motor vehicle), a rotary output element (e.g., a shaft which is coaxial with the input element and can drive a variable-speed transmission in a motor vehicle), at least one signal generating means (e.g., a tachometer generator) for monitoring the RPM of at least one of the input and output elements, control means (preferably an electronic control circuit) having at least one first input connected with the monitoring means, torque transmitting means (such as a hydromechanical clutch or a hydromechanical transmission) interposed between the input and output elements, means for regulating the pressure and/or flow of fluid in at least one adjustable hydraulic pump forming part of the torque transmitting means, at least one signal transmitting output provided in or on the control means and serving to transmit signals to the regulating means, and at least one second input provided in or on the control means and serving to receive from the regulating means signals denoting the condition of the regulating means.

The regulating means can comprise an adjustable valve which controls the flow of fluid in the pump, and means for adjusting the valve. The second input of the control means is then connected to the valve and serves to transmit to the control means signals denoting the rate of fluid flow in the pump. The output of the control means is connected to the adjusting means, and the control means is designed to transmit to the adjusting means signals as a function of the characteristics of signals which are transmitted to the first and second inputs. The valve can be said to constitute a means for directly influencing the pump. The means for adjusting the pump can be said to constitute a means for indirectly influencing the pump.

More specifically if the torque transmitting means includes a clutch, the pump can comprise a rotary cylinder which is connected to the input element, pistons which are reciprocably mounted in the cylinder, a rotary housing for the cylinder, means (such as a disc-shaped member) for connecting the housing with the output element, a rotary piston stroke varying device (such as a tiltable wobble plate which is connected with the housing, a source of hydraulic fluid, and a casing for the pump. The regulating means then comprises an adjustable valve which determines the flow of hydraulic fluid between the pump and the source, and means for adjusting the valve in response to signals from the output of the control means. The aforementioned disc-shaped member has at least one opening for the flow of hydraulic fluid between the pump and the source. In accordance with a presently preferred embodiment, the pump of the clutch is an axial piston pump. The casing for and the disc-shaped member of such pump define a path for the flow of hydraulic fluid between the pump and the source. The opening or openings of the disc-shaped member define a first portion of such path, a channel of the casing can define a second portion of the path, and one or more openings of the casing define a third portion of the path. The channel of the casing preferably surrounds the disc-shaped member and the opening or openings of the casing can serve to admit fluid to the valve. A valve plate is preferably installed between the cylinder and the disc-shaped member. The piston stroke varying device can be rigid with the housing and the casing can be provided with means (e.g., a ripple) for admitting hydraulic fluid from the source into the housing; the valve then serves as a means for selecting the rate of fluid flow from the pump to the source.

In lieu of a single pump, the torque transmitting means can comprise a piston pump and a piston motor. The regulating means then preferably comprises discrete adjusting means for the pump and motor, and the control means then preferably comprises discrete signal transmitting outputs for the discrete adjusting means. The pump is driven by the input element and drives the motor, and the motor drives the output element. The pump includes an adjustable fluid influencing component (such as a tiltable wobble plate), and the regulating means comprises means for adjusting the component.

The pump and the motor together constitute a transmission wherein the pump is preferably an axial piston pump having a rotary cylinder driven by the input element, a tiltable wobble plate constituting the aforementioned adjustable fluid influencing component, and pistons which are reciprocable in the cylinder and track the wobble plate. The regulating means of such drive includes means for tilting the wobble plate in response to signals from the output of the control means. The motor preferably includes a second cylinder which is rigid with the output element, a second wobble plate, pistons which are reciprocable in the second cylinder and track the second wobble plate, and a non-rotatable housing for the second cylinder and second wobble plate. The transmission further comprises means for conveying pressurized hydraulic fluid from the pump to the motor. Such conveying means can comprise a member (e.g., a disc) which is rigid with the second housing, and valve plates which flank the member. The conveying means can further comprise a motion transmitting member (e.g., a disc) which is rigid with the output element, and a third valve plate between the motion transmitting member and the cylinder of the pump.

A relief valve can be connected with the conveying means, and such relief valve can include a plenum chamber which defines a portion of the path for the flow of pressurized hydraulic fluid from the pump to the motor. Such drive can further comprise a gauge or other suitable signal generating means which monitors the pressure of hydraulic fluid between the pump and the motor (e.g., in the plenum chamber) and transmits signals to a third input of the control means. The aforementioned member of the conveying means defines a path for the flow of hydraulic fluid from the pump to the plenum chamber and from the plenum chamber to the motor.

In accordance with a presently preferred embodiment of the transmission, the pump comprises a first adjustable fluid flow varying device (such as a tiltable wobble plate), and the motor comprises a second adjustable fluid flow varying device (such as a second wobble plate). The regulating means then comprises first means for adjusting the first fluid flow varying device, and second means for adjusting the second fluid flow varying device. Linkages, gears and/or other suitable means can be provided to transmit motion between the adjusting means and the respective fluid flow varying devices. The control means then preferably comprises discrete outputs for transmission of signals to the first and second adjusting means. The first and second adjusting means can be connected to each other exclusively by way of the control means.

The pump of the clutch or transmission, and/or the motor of the transmission can constitute a gear pump or gear motor.

The input element may but need not be coaxial with the output element.

The novel features which are considered as characteristic of the invention are set forth in particular in the appended claims. The improved drive itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
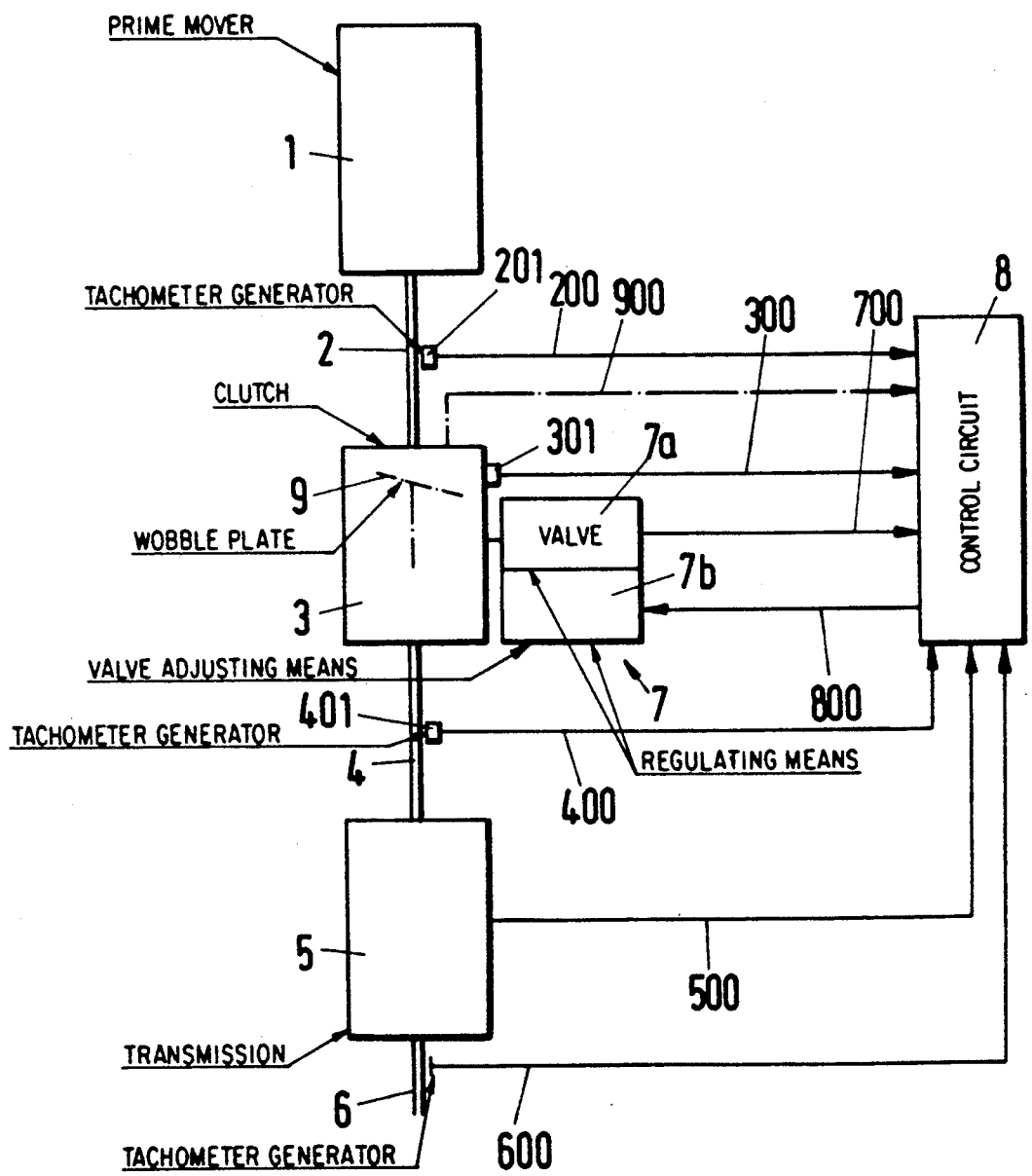
FIG. 1 is a diagrammatic view of a hydromechanical drive which embodies one form of the invention and wherein the means for transmitting torque between the input and output elements comprises a clutch.

FIG. 1 is a diagrammatic view of a hydromechanical drive which embodies one form of the invention. The drive employs a clutch 3 and has a rotary input element 2 (e.g., a shaft) which can receive torque from a prime mover 1, e.g., an internal combustion engine. The rotary output element 4 (e.g., a shaft) of the clutch 3 constitutes the input element of a transmission 5 having an output element 6 serving to drive one or more torque receiving devices, not shown, at a speed as determined by the selected gear ratio of the transmission 5. For example, the output element 6 (e.g., a shaft) of the transmission 5 can drive the wheels of a motor vehicle, the moving parts of a machine or the like.

The clutch 3 is a hydromechanical clutch which defines a path for the circulation of a hydraulic fluid and cooperates with regulating means 7 serving to permit, oppose, throttle or prevent the flow of hydraulic fluid along the path. The regulating means 7 includes an adjustable valve 7a and adjusting means 7b (e.g., a servomotor) for the valve 7a. The adjusting means 7b has an input which receives signals from the output 800 of a preferably electronic control circuit 8, and the valve 7a has an output which transmits signals to the input 700 of the control unit 8. The latter further comprises an input 200 for signals from a device 201 (e.g., a tachometer generator of any known design) which monitors the RPM of the input element 2, and an input 400 which receives signals from a device 401 (e.g., a tachometer generator) which monitors the RPM of the output element 4. A device 301 is provided on or in the clutch 3 to monitor the pressure of hydraulic fluid, and signals which are generated by the device 301 (e.g., a pressure gauge) are transmitted to the input 300 of the control circuit 8. The input 700 receives signals which denote the position of the valving element in the valve 7a. The transmission 5 has several speed ratios, and signals denoting the selected speed ratio of the transmission 5 are applied to the input 500 of the control circuit 8.

The character 9 denotes a movable or stationary pressure varying, piston guiding or other fluid flow influencing component of the clutch 3; the position of this component is monitored by a device which transmits appropriate signals to the input 900 of the control circuit 8. The RPM of the output element 6 of the transmission 5 is monitored by a device which can be identical with or analogous to the device 201 or 401 and transmits signals to the input 600 of the control circuit 8. The transmission 5 can constitute a second hydromechanical unit, and the improved drive then comprises second regulating means, corresponding to the regulating means 7, for reception of signals from and for transmission of signals to the control circuit 8 (i.e., the circuit 8 is then provided with additional inputs corresponding to those shown at 300 and 700 as well as with an additional output corresponding to the output 800.

When the valve 7a of the regulating means 7 necessitates an adjustment, the output 800 of the control circuit 8 transmits a signal to the adjusting means 7b which adjusts the valve 7a so that the latter influences the flow of fluid through the hydromechanical clutch 3. The adjusted position of the valve 7a is then signaled to the input 700 of the control circuit 8, either directly from the valve 7a (as actually shown in FIG. 1) and/or from the adjusting means 7b (see FIG. 3).

The improved drive establishes a direct relationship between the quantity of conveyed pressurized fluid, the setting of the valve 7a in the regulating means 7, the internal pressure in the clutch 3, and the transmitted torque.

Figure 2:
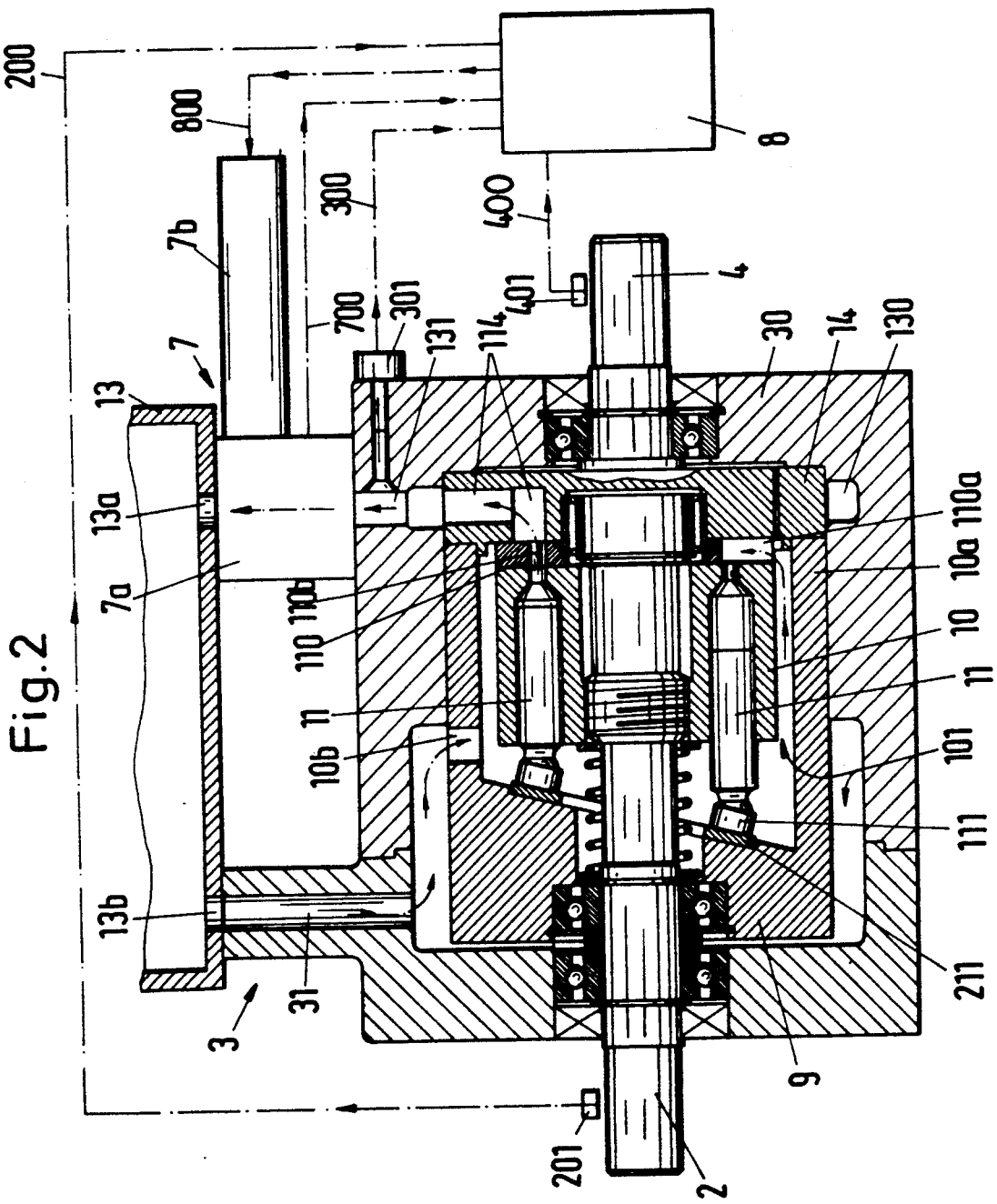
FIG. 2 is an enlarged sectional view of the clutch.

FIG. 2 shows the details of a hydromechanical clutch 3 which can be utilized in the drive of FIG. 1. The input element 2 (i.e., the output element of the prime mover 1) is rigidly connected with a cylinder block 10 (hereinafter called cylinder), i.e., the cylinder 10 shares the angular movements of the input element 2. The cylinder 10 has a set of axially parallel cylinder chambers or bores for axially parallel reciprocable pistons 11 which have end portions projecting from the cylinder 10 and provided with tiltable followers 111 abutting substantially washer-like track 211 of a wobble plate 9 (also called tilting box or tilting block). The wobble plate 9 is integral with or is ridigly connected to a rotary pump housing 10a surrounding the cylinder 10. The parts 9, 10, 10a, 11, 211 jointly constitute an axial piston pump 101 which is installed in a housing or casing 30 of the clutch 3.

When the prime mover 1 is on and rotates the input element 2, the input element 2 transmits torque to the cylinder 10 which causes the pistons 11 to orbit about the axis of the input element 2 whereby the followers 111 move along the track 211 of the wobble plate 9 and reciprocate in the respective cylinder chambers or bores of the cylinder 10. The pistons 11 draw hydraulic fluid into and expel hydraulic fluid from the respective chambers or bores of the cylinder 10 as long as they move relative to the track 211. As mentioned above, the rotary wobble plate 9 which serves as an abutment or back support for the track 211 is rigid or integral with the pump housing 10a in the casing 30 of the clutch 3.

The casing 30 is adjacent a source 13 of hydraulic fluid, e.g., a tank containing a supply of oil or any other suitable liquid. It is presently preferred to employ oil because such fluid can lubricate the moving parts of the clutch 3. It is assumed that the tank 13 is installed at a level above the casing 30. The bottom wall of this tank has an outlet port 13b for admission of hydraulic fluid (hereinafter called oil) into a conduit 31 provided on the casing 30 and serving to admit oil into the interior of the clutch 3. A second (inlet) port 13b in the bottom wall of the tank 13 is provided to return oil from the casing 30 by way of the valve 7a of the regulating means 7. The casing 30 defines a path wherein the oil stream flows from the conduit 31 into the valve 7a and thence back into the tank 13 at a rate which is determined by the setting of the valving element in the valve, i.e., by the adjusting means 7b (e.g., a servomotor) for the valve 7a. The pump housing 10a has an inlet opening 10b which receives the oil stream entering the casing 30 by way of the conduit 31.

That axial end of the pump housing 10a which is remote from the wobble plate 9 is adjacent a valve plate 110 having passages 110a which admit oil into the cylinder chambers for the pistons 11. Furthermore, the valve plate 110 has ports which 110b permit pressurized oil to flow from the chambers or bores of the cylinder 10 into the openings of a disc-shaped motion transmitting member 14 which is rotatably mounted in the casing 30. The motion transmitting member 14 (hereinafter called disc for short) has openings 114 in communication with an annular channel 130 which is machined into or is otherwise formed in the casing 30 of the clutch 3. The channel 130 surrounds the peripheral surface of the disc 14 and communicates with a radially extending hole or opening 131 provided in the casing 30 and serving to convey oil to the valve 7a wherein the returning stream of oil flows toward and through the inlet port 13a so as to reenter the tank 13. The term "valve" is intended to be interpreted in its broadest sense, i.e., the part 7a can constitute any means which is capable of properly regulating the flow of oil between the opening 131 of the casing 30 and the inlet port 13a of the tank 13. For example, instead of employing a standard valve, the drive of FIGS. 1 and 2 can employ an adjustable flow restrictor or the like. The arrangement is preferably such that the valve 7a can regulate the flow of oil from the opening 131 into the inlet port 13a with the same degree of affectiveness regardless of the direction of rotation of the input element 2. The valve plate 110 serves as a means for admitting oil into as well as for conveying oil from the chambers or bores for the pistons 11 in the cylinder 10 of the axial piston pump.

The gauge 301 monitors the pressure of oil in the casing 30 upstream of the valve 7a and transmits appropriate signals to the input 300 of the control circuit 8. At the same time, the input 200 of the control circuit 8 receives signals from the tachometer generator 201, and the input 400 of the control circuit 8 receives signals from the tachometer generator 401. The output 800 of the control circuit 8 transmits signals which cause the adjusting means 7b to set the valve 7a, and the input 700 receives signals denoting the setting of the valve.

The control circuit 8 processes all signals which are transmitted to its inputs and generates an appropriate signal which is transmitted to the adjusting means 7b via output 800. Thus, signals which appear at the output 800 of the control circuit 8 determine the setting of the valve 7a and hence the rate at which the valve permits oil to flow from the opening 131 of the disc 14 back into the tank 13.

If the adjusting means 7b receives a signal which causes the valve 7a to interrupt or reduce the flow of oil back to the tank 13, the pump housing 10a is set in rotary motion, together with the wobble plate 9, because the strokes of the pistons 11 are shortened in view of a reduction of the quantity of oil which can flow through the casing 30 and back to the tank 13. The rotational speed of the pump housing 10a and wobble plate 9 depends upon the RPM of the input element 2, upon the setting of the valve 7a and upon the pressure of oil in the cylinder chamber portions between the pistons 11 and the valve 7a. Such pressure, in turn, is directly dependent upon the resistance which is encountered by and tends to stop the rotating pump housing 10a. The disc 14 is connected to the output shaft 4 and receives torque from the pump housing 10a. Thus, the output element 4 is set in rotary motion in response to rotation of the pump housing 10a.

The illustrated axial piston pump 101 is designed in such a way that it can drive the output element 4 irrespective of the direction of rotation of the input element 2, i.e., the output element 4 can be driven in a clockwise or in a counter-clockwise direction. This axial piston pump is but one of several types of pumps which can be used in the clutch 3, as long as the selected pump is capable of ensuring that the direction of oil flow through the casing 30 is independent of the direction of rotation of the cylinder block 10, i.e., that the direction of flow of oil remains unchanged. This, in turn, ensures that the clutch 3 can rotate the output element 4 in either direction without the need for the utilization of specially designed auxiliary or additional regulating and/or control means.

It is presently preferred to provide a tank 13 or a similar source of oil which is located outside of the casing 30. This renders it possible to more accurately monitor the pressure of oil and/or to more accurate regulate the rate of oil flow through the clutch 30. However, it is equally within the purview of the invention to install the source of hydraulic fluid in the casing 30. Moreover, even an externally mounted source of fluid can be integrated into the casing 30.

Since the control circuit 8 is designed to receive and evaluate or process signals denoting all parameters (or all important parameters) which influence the rotational speed of the output element 4, the operation of the clutch 3 can optimally conform to momentary requirements and any changes of one or more monitored parameters can immediately influence the RPM and/or the torque of the output element 4.

The control circuit 8 and the adjusting means 7b of the regulating means 7 can constitute a slightly modified version of a circuit which is available at Baumüller Nürnberg GmbH, Nürnberg, Federal Republic of Germany. Reference may be had to page 15 of the English-language brochure entitled "Baumotronic three-phase servo drives bug/bus DS" which is distributed by Baumüller Nürnberg GmbH.

A valve which can be used in the clutch 3 of FIG. 2 is known as Micro 26 and is available at Schiedrum Hydraulik GmbH & Co. KG, Düsseldorf-Eller, Federal Republic of Germany. Reference may be had to the March 1982 edition of "Micro-Hydraulic" which is distributed by Schiedrum Hydraulik GmbH & Co. KG.

FIGS. 3 to 6 illustrate certain parts of a modified drive which are designed in such a way that the rotary housing of a pump can be directly coupled to an output element (such as the output element 4) and an input element forming part of the prime mover. Such transmission of torque takes place by way of the disc 14 which is connected (a) with a cylinder block (cylinder) 10' (FIGS. 3—5) or an internal gear 45 (FIG. 6) and (b) with the output element 4. These modified drives exhibit the desirable feature that the hydraulic output of a pump forming part of a hydraulic transmission is directly or practically directly coupled to the hydraulic input of the motor of such transmission. The transmission is directly connected with the respective engine, and the pump means is integrated into the engine. The characters 2 and 4 again denote an input element and an output element, respectively.

Figure 3:
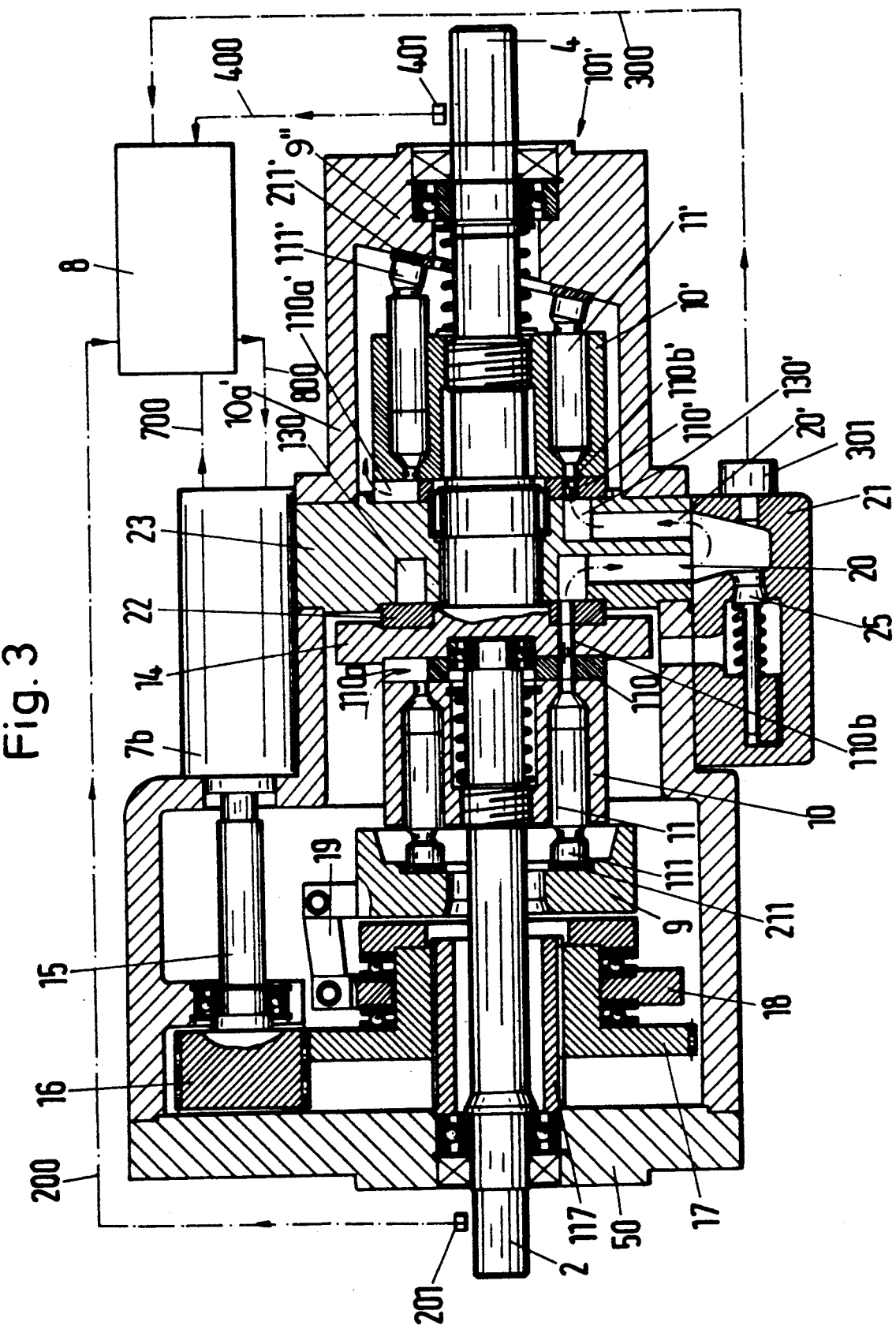
FIG. 3 is a partly sectional and partly diagrammatic view of a portion of a modified drive which employs a transmission as a means for transmitting torque between the input and output elements.
Figure 4:
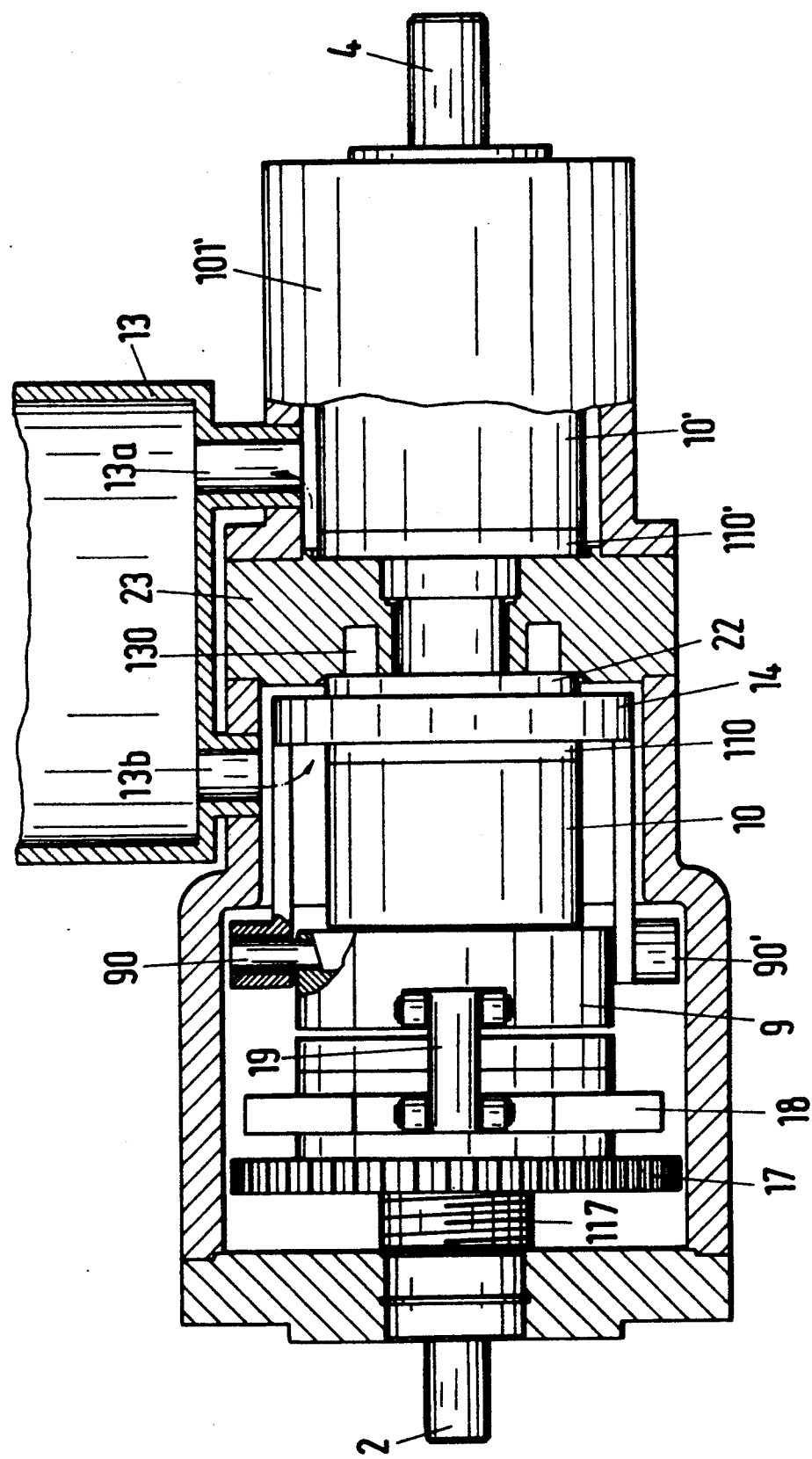
FIG. 4 is a front elevational view of the transmission, with certain parts broken away.

In the embodiment of FIGS. 3 and 4, an axial piston pump is combined with an axial piston motor to form therewith a hydromechanical transmission. The input element 2 is non-rotatably connected with a cylinder block (cylinder) 10, the same as in the embodiment of FIGS. 1 and 2, so that the pistons 11 in the axially parallel bores or chambers of the cylinder 10 are compelled to orbit about the axis of the cylinder as soon as the output element 2 is set in rotary motion. The tiltable followers 111 of the pistons 11 abut a track 211 on a wobble plate 9 the inclination of which with reference to the axis of rotation of the cylinder 10 is adjustable.

Thus, the wobble plate 9 in the axial piston pump of the transmission shown in FIGS. 3 and 4 is not an integral or rigidly connected part of the pump housing 50. By changing the inclination of the wobble plate 9 and track 211, the controls of the drive embodying the transmission of FIGS. 3 and 4 can select the strokes of the pistons 11 and hence the quantity of oil which is pumped in response to rotation of the input element 2. FIG. 3 shows the wobble plate 9 and the track 211 in their neutral positions in which the length of strokes of the pistons 11 is reduced to zero.

The inclination of the wobble plate 9 and track 211 can be altered by the adjusting means 7b. Thus, the adjustable wobble plate 9 of FIG. 3 replaces the valve 7a of FIG. 2. The means for transmitting motion from the adjusting means 7b to the wobble plate 9 (i.e., the means for actually tilting the wobble plate 9 and track 211 to and from their neutral positions) comprises a rotary shaft 15 which can drive a first gear 16 in mesh with a second gear 17 which is coaxial with the input element 2. The gear 17 has an annulus of external teeth in mesh with the external teeth of the gear 16, and an internal thread in mesh with the external thread of an axially fixed, sleeve-like shifting or displacing member 117. The latter is non-rotatably mounted in the casing and causes the gear 17 to move axially to the left or to the right (as seen in FIG. 3) in response to rotation of the gear 16. A linkage 19 between a disc-shaped follower 18 and the wobble plate 9 causes the latter to change its inclination (and hence the inclination of the track 211) with reference to the axis of the input element 2 when the adjusting means 7b causes the shaft 15 to turn in a clockwise or in a counterclockwise direction to the extent which is determined by the characteristics of the signal at the output 800 of the control circuit 8. The follower 18 is rotatably mounted on the gear 17 between two antifriction bearings. The axial length of the gear 16 is selected in such a way that this gear remains in mesh with the gear 17 in each axial position of the gear 17. The wobble plate 9 is hollow and has an internal convex surface in mesh with a complementary concave bearing surface on a collar of the output element 2 so that the wobble plate can be tilted by the linkage 19 in response to axial displacement or shifting of the gear 17.

That end of the cylinder 10 which is remote from the wobble plate 9 is adjacent a first valve plate 110 which is formed with radially extending openings 110a and axially parallel openings 110b. The openings 110a admit oil into the chambers for the pistons 11, and the axially parallel openings 110b receive pressurized oil from the cylinder chambers for admission into registering axially parallel openings of the disc 14. The latter is adjacent a second valve plate 22 which can admit pressurized oil into an annular channel 130 in a second disc 23. The annular chamber 130 communicates with a radially outwardly extending passage 20 which admits oil to the plenum chamber 21 of a relief valve 25 serving as a means for limiting the pressure of oil leaving the plenum chamber 21 by way of a radially inwardly extending passage 20'.

The just described axial piston pump is mirror symmetrical to an axial piston motor 101' having a cylinder block (cylinder) 10' for axially parallel pistons 11'. The motor 101' further comprises a non-rotatable housing 10a' for the cylinder 10', and a valve plate 110' with radially extending openings 110a' and axially parallel openings 110b'. The axially parallel openings 110b' communicate with a channel 130' in the disc 23, and the channel 130' receives oil from the radially inwardly extending passage 20'. The followers 111' of the pistons 11' the track 211' of a non-tiltable wobble plate 9". The cylinder 10' of the motor 101' is non-rotatably connected with the output element 4. The latter is rotatably journalled in the housing of the motor 101'. The disc 23 is disposed between the motor and the pump and is connected to the valve plate 22 and disc 14. The wobble plate 9" is rigid with the housing 10a'.

The pump and/or the motor of FIG. 3 can be replaced with a different pump or motor, e.g., with a different piston pump or with a gear pump, or with a different piston type motor or with a gear motor.

The control circuit 8 has an input 400 which receives signals from the tachometer generator 401 serving as a means for monitoring the RPM of the output element 4, and an input 200 which receives signals from the tachometer generator 201 serving as a means for monitoring the RPM of the input element 2. A pressure gauge 301 monitors the pressure of oil in the plenum chamber 21 of the relief valve 25 and transmits appropriate signals to the input 300 of the control circuit 8. The output 800 of the control circuit 8 transmits signals to the adjusting means 7b which selects the inclination of the wobble plate 9 and track 211. The input 700 of the control circuit 8 receives signals denoting the inclination of the wobble plate 9.

FIG. 4 shows the oil tank 13 for a supply of oil which enters the housing 50 of the pump at 13b and receives recirculated oil at 13a. FIG. 4 further shows a trunnion 90 which extends radially at the wobble plate 9 and is articulately connected to the linkage 19 so as to tilt the wobble plate 9 and the track 211 in response to axial displacement or shifting of the gear 17. The extension 90 is mounted in a bearing 90'.

The operation of the drive embodying the hydromechanical transmission of FIGS. 3 and 4 is as follows:

The input element 2 is non-rotatably connected with the cylinder 10 and, therefore, the pistons 11 of the first pump are compelled to orbit about the axis of the cylinder 10 when the input element 2 is set in rotary motion, e.g., by the prime mover 1 of FIG. 1. The followers 111 of the pistons 11 slide along the track 211 and perform axial movements (strokes) the length of which is determined by the axial position of the gear 17, i.e., by the selected inclination of the wobble plate 9 and track 211. When the wobble plate 9 is tilted from the neutral position of FIG. 3, the pistons 11 reciprocate and draw oil from the tank 13 via valve plate 110. Pressurized oil leaves the chambers for the pistons 111 via valve plate 110, disc 14 and valve plate 22 to flow into annular channel 130. Oil thereupon flows from the channel 130 via passage 20, plenum chamber 21 of the relief valve 25, passage 20' and into the channel 130' (the illustrated channel 130' is not an annular channel even though it is possible to provide the disc 23 with an annular channel for reception of pressurized oil). From the channel 130', pressurized oil flows through the valve plate 110' into the chambers of the cylinder 10' to enter those chambers wherein the pistons 11' move to the right (as seen in FIG. 3) and to be expelled from those chambers wherein the pistons 11' move to the left. Oil flowing into the chambers of the cylinder 10' maintains the followers 111' of the pistons 11' in engagement with the track 211'. plate 211'.

The pump and the motor 101' can cooperate to drive the output element 4. The pump rotates the cylinder 10' of the motor 101' and the cylinder 10' is non-rotatably connected to and thus drives the output element 4. The disc 14 rotates with the cylinder 10 of the pump. Oil which leaves the housing of the motor 101' flows back into the tank 13.

It is now assumed that the input element 2 is driven and that the output element 4 encounters opposition to its rotation. If the input element 2 is driven while the wobble plate 9 and the track 211 are maintained in the neutral positions of FIG. 3, the input element 2 merely rotates the cylinder 10, i.e., the pistons 11 are compelled to orbit about the axis of the input element 2 but the length of their axial strokes is zero so that they do not draw any oil from the tank 13. Thus, the pump does not build up a hydrostatic pressure. The input element 2 can be readily rotated in response to the application of minimal torque, namely in response to the application of a torque which is necessary to overcome friction between the rotating parts 2, 10 and orbiting parts 11 on the one hand, and the parts which are in contact with such rotating and orbiting parts. The transmission embodying the pump and the motor 101' is practically disengaged and is idling.

If the output 800 of the control circuit 8 transmits a signal which causes the adjusting means 7b to change the inclination of the wobble plate 9, the pistons 11 begin to perform strokes of a length which is determined by inclination of the track 211 whereby the pistons 11 force pressurized oil to flow through the valve plate 110, disc 14, valve plate 22, disc 23 and valve plate 110' (by way of the annular channel 130, radial passages 20, 20', plenum chamber 21 and channel 130'). This results in penetration of pressurized oil into the chambers or bores for the pistons 11'. Hydrostatic pressure between the pistons 11 and 11' develops as a result of rotation of the input element 2. The latter transmits torque to the cylinder 10, pistons 11, followers 111 and wobble plate 9 with track 211. The wobble plate 9 transmits torque directly to the disc 14 and to the output element 4 which is connected thereto.

At the same time, hydrostatic pressure acting upon the pistons 11' also generates torque which is transmitted to the output element 4. Such indirectly applied torque is superimposed upon the torque from the disc 14.

If the inclination of the wobble plate 9 with reference to the neutral position is only slight, the rate of oil flow is relatively small but the hydrostatic pressure of oil is very high. This causes the pump and the motor 101' to transmit to the output element 4 a substantial torque while the output element 4 rotates at a low RPM.

If the inclination of the wobble plate 9 deviates appreciably from that in the neutral position of FIG. 3, and the input element 2 receives torque to rotate the cylinder block 10 at an elevated speed, the pump conveys a large quantity of oil per unit of time but the hydrostatic pressure of conveyed oil is relatively low. The output element 4 is then rotated at a high RPM but the torque which is transmitted thereto is small.

The pressure relief valve 25 constitutes a safety feature. The pressure gauge 301 of the transmission shown in FIGS. 3 and 4 is designed to monitor the pressure in the plenum chamber 21 of this relief valve and to transmit signals denoting the monitored pressure to the input 300 of the control circuit 8.

It will be noted that the valve 7a of the clutch 3 shown in FIGS. 1 and 2 is replaced by a flow regulating assembly including the adjusting means 7b, the shaft 15, the gears 16, 17, the follower 18, the linkage 19 and tiltable wobble plate 9.

Figure 5:
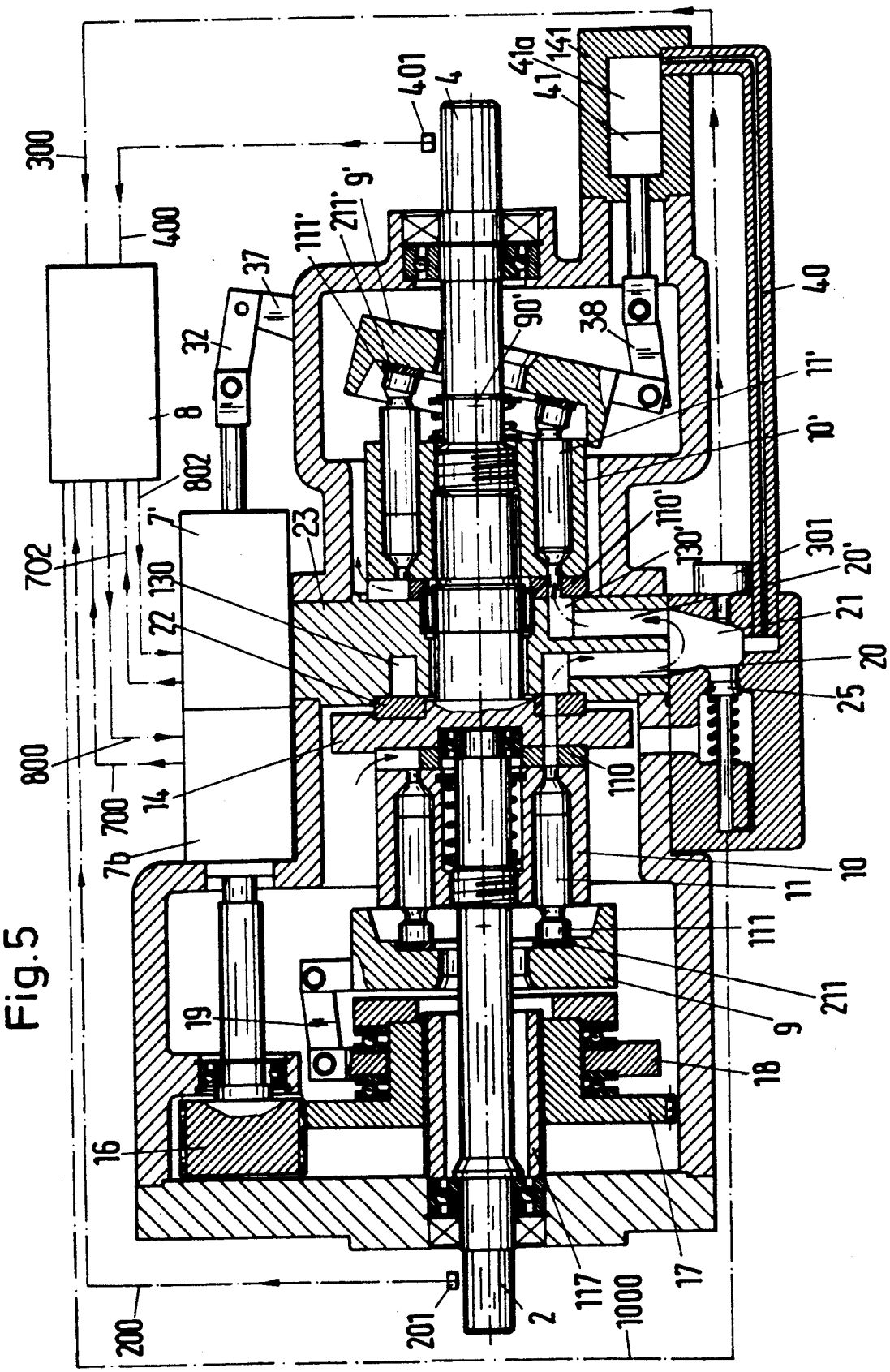
FIG. 5 is a fragmentary partly sectional and partly diagrammatic view of a drive which constitutes a first modification of the drive embodying the structure of FIGS. 3 and 4.

The drive which embodies the hydromechanical transmission of FIG. 5 is analogous to that of FIGS. 3-4 because the regulating means again operate without a valve.

The construction of the pump in the transmission which is shown in FIG. 5 is similar to or identical with that of the pump in the transmission of FIGS. 3-4. Thus, the input element 2 is drivingly connected with the cylinder 10 which has an annulus of axially parallel chambers or bores for axially reciprocable pistons 11. The followers 111 of these pistons contact the track 211 the inclination of which can be changed by the tiltable wobble plate 9. The means for changing the inclination of the wobble plate 9 and track 211 comprises the adjusting means 7b which receives signals from the output 800 of the electronic control circuit 8, a shaft for the first gear 16, an axially movable second gear 17, a follower 18 which is rotatably mounted on the gear 17, and a linkage 19 which couples the follower 18 with the tiltable wobble plate 9. The gear 17 has internal threads in mesh with the external threads of the fixedly mounted displacing or shifting member 117. The latter is a sleeve which surrounds the input element 2. The chambers of the cylinder 10 receive and discharge oil by way of the valve plate 110 which is adjacent the disc 14. The latter is connected to the output element 4. The disc 14 is adjacent the valve plate 22 which, in turn, is adjacent the disc 23. The function of the annular channel 130, passages 20, 20', non-annular channel 130' and relief valve 25 with plenum chamber 21 is the same as described in connection with FIGS. 3 and 4.

The cylinder 10' of the motor in the transmission of FIG. 5 is analogous to the cylinder 10' in the motor 101' of FIG. 3, and this cylinder has axially parallel chambers for pistons 11' having followers 111' which contact the track 211' on the wobble plate 9'. The main difference between the embodiments of FIGS. 3-4 and 5 is that the inclination of the track 211' in the motor of FIG. 5 is adjustable by the wobble plate 9' which is tiltably mounted on a spherical bearing of the output element 4 and can be tilted by a linkage 32 with assistance from an axially movable piston 41 forming part of a servomotor 141 having a chamber 41a which is communicatively connected with the plenum chamber 21 of the pressure relief valve 25 by a conduit 40.

The structure of FIG. 5 further comprises two tachometer generators 201, 401 which monitor the RPM of the input element 2 and output element 4 and transmit appropriate signals to the respective inputs 200, 400 of the control circuit 8. The input 300 of the control circuit 8 receives signals from the pressure gauge 301 which monitors the pressure of oil in the plenum chamber 21 of the pressure relief valve 25. An input 700 of the control circuit 8 is connected with the adjusting means 7b, and the output 800 of the control circuit can transmit signals to the adjusting means 7b. Signals at the output 800 are used to select the inclination of the wobble plate 9, and signals at the input 700 denote the momentary inclination of the wobble plate 9 and hence of the track 211.

The structure of FIG. 5 further comprises second adjusting means 7' which can transmit signals to the input 702 of the control circuit 8 and can receive signals from the output 802 of the control circuit. The purpose of the adjusting means 7' is to change the inclination of the wobble plate 9' and track 211' in the motor of FIG. 5.

It is desirable to establish a direct or practically direct connection between the hydraulic output of the pump and the hydraulic input of the motor of FIG. 5. The only elements which are interposed between the hydraulic output of the pump and the hydraulic input of the motor are the valve plates which regulate the rate of oil flow. It is further desirable to monitor the internal pressure of the pump and motor and to provide the aforediscussed pressure relief valve 25 or an analogous device which prevents the pressure of oil from rising beyond a preselected maximum permissible value. The control circuit 8 takes into consideration all important parameters including the RPM of the input element 2, the RPM of the output element 4, the pressure in the pump and motor, and the quantity of conveyed oil per unit of time (i.e., the absorption capacity of the pumps). The control circuit 8 receives and evaluates such information and generates signals which are transmitted to the adjusting means 7b and 7' via outputs 800 and 802, respectively, in order to ensure proper inclination of the wobble plates 9, 9' and the respective tracks 211, 211'. The control circuit 8 is preferably designed in such a way that the quantity of circulated oil is kept to a minimum (i.e., that the absorption capacity of the pump and motor is held to a minimum) while the input element 2 indirectly transmits torque to the output element 4.

When the wobble plate 9 is inclined with reference to its neutral position and the wobble plate 9' is held in the neutral position (in which the pistons 11' of the motor perform strokes of zero length), the transmission of FIG. 5 acts not unlike a rigid shaft. The pressure of oil is very high when the inclination of the wobble plate 9 with reference to its neutral position is small. The pump and motor of FIG. 5 cannot transmit torque between the elements 2 and 4 when each of the wobble plates 9 is caused to assume its neutral position.

The manner in which the adjusting means 7b can change the inclination of the wobble plate 9 and track 211 in response to signals from the output 800 of the control circuit 8 is the same as described in connection with FIGS. 3 and 4. The adjusting means 7' receives signals from the output 802 of the control circuit 8 and changes the inclination of the wobble plate 9' by way of the linkage 32 which is coupled to a trunnion (not shown) of the wobble plate 9' by a lever 37. The piston 41 in the cylinder of the servomotor 141 assists the changes of inclination of the wobble plate 9' and track 211' by way of a link 38 which is directly connected to the wobble plate 9'. As explained above, the chamber 41a of the servomotor 141 receives pressurized oil by way of the conduit 40 which, in turn, receives pressurized oil from the plenum chamber 21 of the relief valve 25. The trunnions and the bearings for the trunnions of the wobble plates 9 and 9' can be similar to or identical with the parts 90, 90' shown in FIG. 4.

It is clear that the structure embodying the pumps of FIG. 5 also comprises an oil tank which has been omitted in FIG. 5 for the sake of simplicity and clarity. The manner in which the pump of FIG. 5 receives oil from a tank and in which the motor of FIG. 5 returns oil to the tank is or can be the same as shown in FIG. 4. Thus, the tank 13 can have an outlet port 13b for admission of oil into the pump and an inlet port 13a for reception of oil from the motor of FIG. 5.

FIG. 5 shows that the control circuit 8 has a further input 1000 which receives signals denoting the position of the valving element of the pressure relief valve 25.

Figure 6:
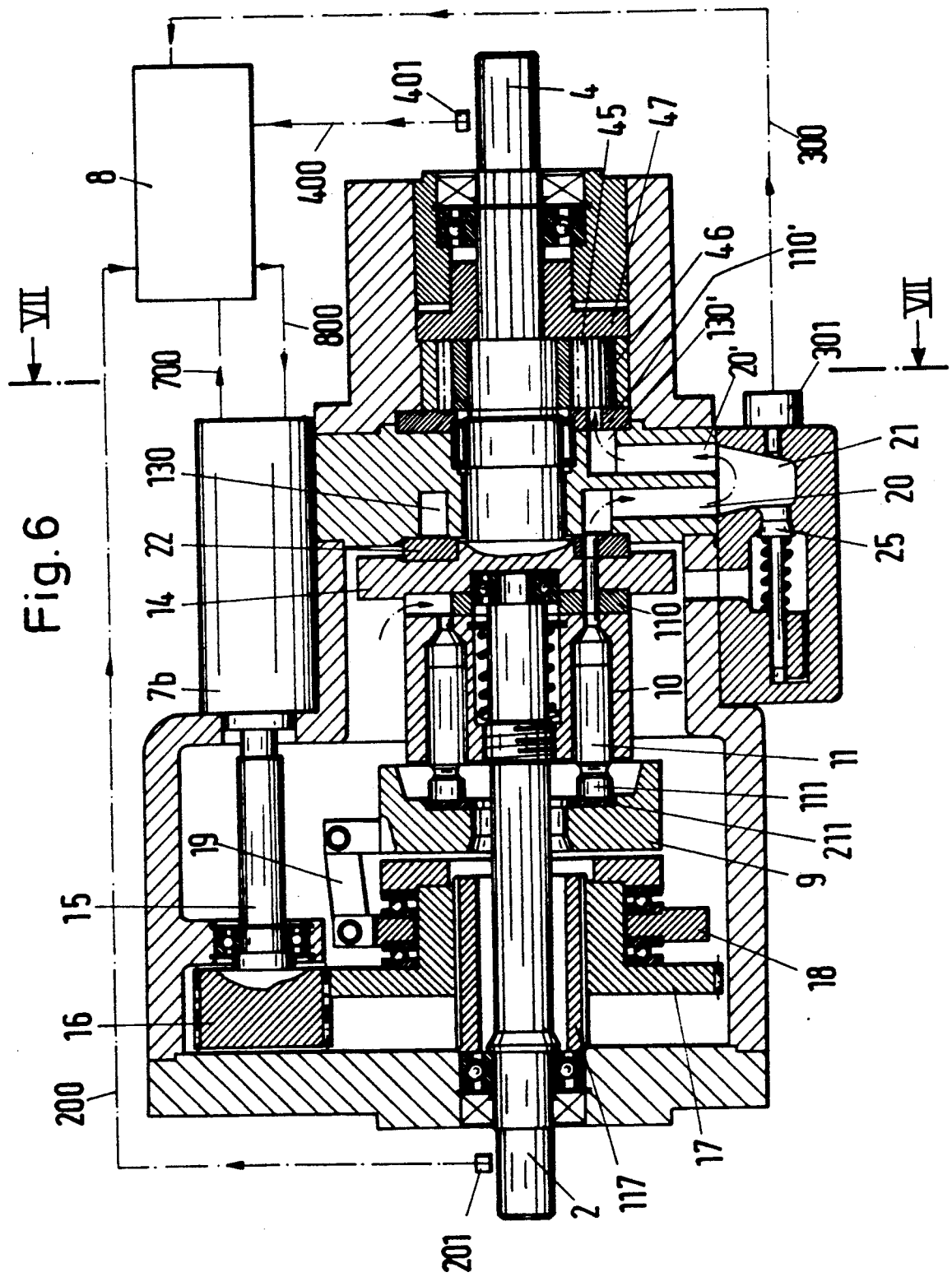
FIG. 6 is a fragmentary partly sectional and partly diagrammatic view of a drive which constitutes a second modification of the drive embodying the structure of FIGS. 3 and 4.
Figure 7:
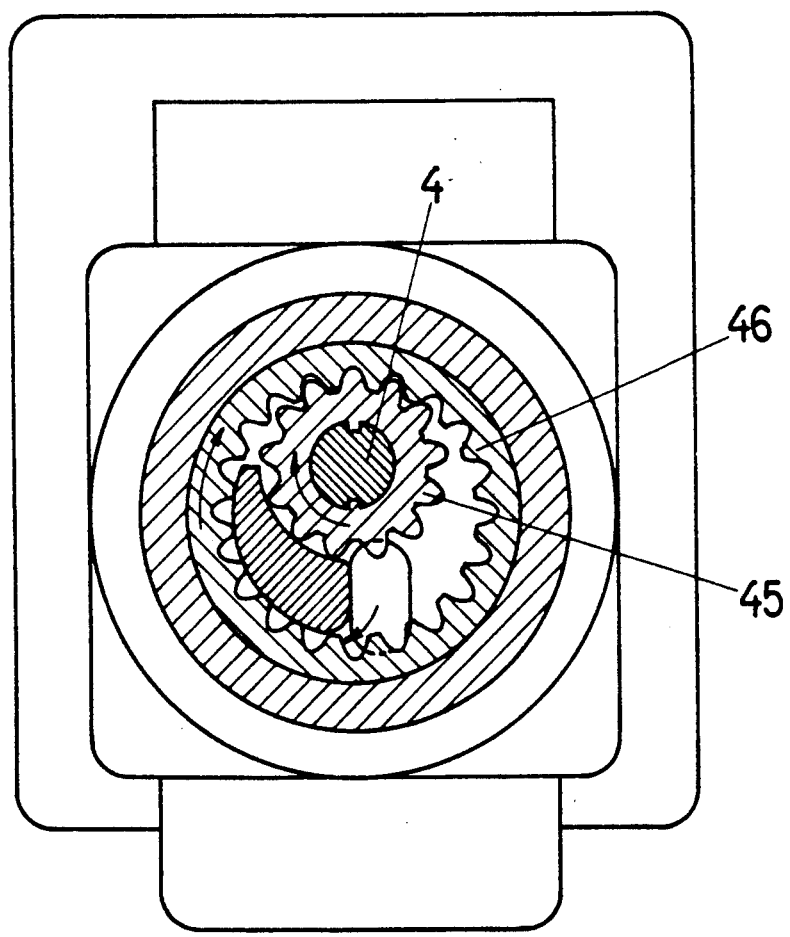
FIG. 7 is a cross section taken along VII of FIG. 6.

FIG. 6 illustrates an embodiment wherein the motor of FIG. 5 is replaced with a gear motor. The gear motor has an internal gear 45, an outer gear 46 and a plate-like sealing device 47 which is adjacent the right-hand axial ends of the gears 45 and 46. The hydromechanical transmission of FIG. 6 employs a single adjusting means 7b which selects the inclination of the wobble plate 9 and the associated track 211. The parameters of the gear motor including the gears 45, 46 need not be monitored. However, the RPM of the output element 4 is monitored by the tachometer generator 401 which transmits signals to the input 400 of the control circuit 8. All other components of the transmission of FIG. 6 are or can be identical with the corresponding components of the structure which is illustrated in FIG. 5.

An important advantage of the improved drive is that it can establish a direct relationship between the volumetric flow of the hydraulic fluid, the position of the adjustable flow regulating means (such as the valve 7a or the wobble plate 9 or 9'), and the torque which is to be transmitted to one or more driven parts. This renders it possible to conform the torque which is to be transmitted to the circumstances at the inlet end of the drive. For example, if the input element 2 drives a clutch (FIG. 2), the characteristic curve of the clutch can conform to the characteristic curve of the prime mover 1 whenever the clutch is engaged, preferably in a fully automatic way. This renders it possible to ensure that the maximum torque which is being transmitted corresponds to maximum torque which the prime mover is capable of transmitting at a particular RPM. This, in turn, facilitates the regulation of fuel consumption, of the emission of combustion products and of the noise which is generated by the prime mover.

An additional important advantage of the improved drive is that the clutch or transmission can be controlled with a high degree of accuracy in dependency upon the prevailing circumstances. This brings about substantial savings in fuel for the prime mover and renders it possible to streamline the shifting and other operations with attendant lengthening of useful life of the drive.

The invention is susceptible of many additional modifications without departing from the spirit of the invention. For example, axial piston pumps or motors can be replaced with radial piston pumps or motors; however, axial piston pumps and/or motors are preferred at this time because they contribute to lower cost of the drive.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A hydromechanical drive, particularly a clutch or a transmission, comprising a rotary input element connectable with a prime mover; a rotary output element; at least one signal generating means for monitoring the RPM of at least one of said input and output elements; control means having at least one first input connected with said monitoring means; torque transmitting means including at least one adjustable hydraulic motor interposed between said input and output elements; and means for regulating the pressure and/or flow of hydraulic fluid in said motor, said control means having at least one signal transmitting output connected with said regulating means and at least one second input arranged to receive from said regulating means signals denoting the condition of said regulating means.

2. The drive of claim 1, wherein said control means comprises an electronic control circuit.

3. The drive of claim 1, wherein said regulating means comprises an adjustable valve which controls the flow of fluid in said motor and means for adjusting said valve, said second input being connected with said valve and being arranged to transmit to said control means signals denoting the rate of fluid flow in said motor, said output being connected to said adjusting means and said control means being arranged to transmit to said adjusting means signals as a function of the characteristics of signals which are transmitted to said first and second inputs.

4. The drive of claim 1, wherein said regulating means includes means for directly influencing said motor.

5. The drive of claim 1, wherein said regulating means comprises means for indirectly influencing said motor.

6. The drive of claim 1, wherein said motor includes an adjustable fluid influencing component and said regulating means comprises means for adjusting said component.

7. The drive of claim 1, wherein said torque transmitting means comprises a transmission including said motor and a hydraulic pump for said motor, said motor being arranged to drive said output element and said pump being driven by said input element.

8. The drive of claim 7, wherein said pump is an axial piston pump having a rotary cylinder driven by said input element, a tiltable wobble plate, and pistons reciprocable in said cylinder and tracking said wobble plate, said regulating means including means for tilting said wobble plate in response to signals from the output of said control means, said motor including a second cylinder rigid with said output element, a second wobble plate, pistons reciprocable in said second cylinder and tracking said second wobble plate, and a non-rotatable housing for said second cylinder and said second wobble plate, and further comprising means for conveying pressurized hydraulic fluid from said pump to said motor.

9. The drive of claim 8, wherein said conveying means comprises a member which is rigid with said second housing and valve plates flanking said member.

10. The drive of claim 1, wherein said input element is coaxial with said output element.

11. The drive of claim 1, wherein said motor is a gear motor and said torque transmitting means further comprises a pump which supplies hydraulic fluid to said gear motor.

12. A hydromechanical drive, particularly a clutch or a transmission, comprising a rotary input element connectable with a prime mover; a rotary output element; first and second signal generating means for respectively monitoring the RPM of said input and output elements; control means having at least one first input connected with said monitoring means; torque transmitting means including at least one adjustable hydraulic piston pump and a piston motor interposed between said input and output elements; and means for regulating the pressure and/or flow of hydraulic fluid in said pump, said control means having at least one signal transmitting output connected with said regulating means and at least one second input arranged to receive from said regulating means signals denoting the condition of said regulating means.

13. The drive of claim 12, wherein said regulating means comprises discrete adjusting means for said pump and said motor, said control means including discrete signal transmitting outputs for said discrete adjusting means.

14. The drive of claim 13, wherein said pump is driven by said input element, said motor being driven by said pump and being arranged to drive said output element.

15. A hydromechanical drive, particularly a clutch or a transmission, comprising a rotary input element connectable with a prime mover; a rotary output element; at least one signal generating means for monitoring the RPM of at least one of said input and output elements; control means having at least one first input connected with said monitoring means; torque transmitting means including at least one adjustable hydraulic motor interposed between said input and output elements, said motor comprising a rotary cylinder connected with said input element, pistons reciprocably mounted in said cylinder, a rotary housing for said cylinder, means for connecting said housing with said output element, and a rotary piston stroke varying device connected with said housing; a casing for said motor; a source of hydraulic fluid; and means for regulating the pressure and/or flow of hydraulic fluid in said pump, said control means having at least one signal transmitting output connected with said regulating means and at least one second input arranged to receive from said regulating means signals denoting the condition of said regulating means, said regulating means including adjustable valve means arranged to determine the flow of fluid between said motor and said source and means for adjusting said valve means in response to signals from the output of said control means.

16. The drive of claim 15, wherein said connecting means includes a disc having at least one opening for the flow of fluid between said motor and said source.

17. The drive of claim 15, wherein said motor is an axial piston motor.

18. The drive of claim 15, wherein said connecting means includes a disc, said casing and said disc defining a path for the flow of fluid between said motor and said source.

19. The drive of claim 18, wherein said disc has at least one first opening defining a first portion of said path, said casing having a channel defining a second portion of said path, and at least one opening defining a third portion of said path.

20. The drive of claim 19, wherein said channel surrounds said disc.

21. The drive of claim 19, wherein the opening of said casing is arranged to admit fluid to said valve means.

22. The drive of claim 15, further comprising a valve plate between said cylinder and said connecting means.

23. The drive of claim 15, wherein said torque transmitting means comprises a clutch including said motor, said piston stroke varying device being rigid with said housing and said casing having means for admitting fluid from said source into said housing, said valve means being arranged to select the rate of fluid flow from said motor to said source.

24. A hydromechanical drive, particularly a clutch or a transmission, comprising a rotary input element connectable with a prime mover; a rotary output element; at least one signal generating means for monitoring the RPM of at least one of said input and output elements; control means having at least one first input connected with said monitoring means; torque transmitting means comprising a transmission interposed between said input and output elements and including a hydraulic axial piston pump and a hydraulic motor driven by said pump, said pump having a first rotary cylinder driven by said input element, a tiltable first wobble plate, and pistons reciprocable in said first cylinder and tracking said first wobble plate, said motor including a second cylinder rigid with said output element, a second wobble plate, pistons reciprocable in said second cylinder and tracking said second wobble plate, and a non-rotatable housing for said second cylinder and said second wobble plate; means for conveying pressurized hydraulic fluid from said pump to said motor including a member which is rigid with said second housing, first and second valve plates flanking said member, a motion transmitting member rigid with said output element, and a third valve plate between said motion transmitting member and said first cylinder; and means for regulating the pressure and/or flow of hydraulic fluid in said pump, said control means having at least one signal transmitting output connected with said regulating means and at least one second input arranged to receive from said regulating means signals denoting the condition of said regulating means, said regulating means including means for tilting said first wobble plate in response to signals from the output of said control means.

25. A hydromechanical drive, particularly a clutch or a transmission, comprising a rotary input element connectable with a prim mover; a rotary output element; at least one signal generating means for monitoring the RPM of at least one of said input and output elements; control means having at least one first input connected with said monitoring means; torque transmitting means comprising a transmission interposed between said input and output elements and including a hydraulic axial piston pump and a hydrualic motor driven by said pump, said pump having a first rotary cylinder driven by said input element, a tiltable first wobble plate, and pistons reciprocable in said first cylinder and tracking said first wobble plate, said motor including a second cylinder rigid with said output element, a second wobble plate, pistons reciprocable in said second cylinder and tracking said second wobble plate, and a non-rotatable housing for said second cylinder and said second wobble plate; means for conveying pressurized fluid from said pump to said motor; a relief valve connected with said conveying means and having a plenum chamber; signal generating means for monitoring the pressure of fluid in said plenum chamber; and means for regulating the pressure and/or flow of hydraulic fluid in said pump, said control means having at least one signal transmitting output connected with said regulating means, at least one second input arranged to receive from said regulating means signals denoting the condition of said regulating means, and a third input for signals from said pressure monitoring means, said regulating means including means for tilting said first wobble plate in response to signals from the output of said control means.

26. The drive of claim 25, wherein said member of said conveying means defines a path for the flow of hydraulic fluid from said pump to said plenum chamber and from said plenum chamber to said motor.

27. A hydromechanical drive, particularly a clutch or a transmission, comprising a rotary input element connectable with a prime mover; a rotary output element; at least one signal generating means for monitoring the RPM of at least one of said input and output elements; control means having at least one first input connected with said monitoring means; torque transmitting means comprising a transmission including a hydraulic pump driven by said input element and a hydraulic motor driven by said pump and arranged to drive said output element, said pump comprising a first adjustable fluid flow varying device and said motor comprising a second adjustable fluid flow varying device; and means for regulating the pressure and/or the flow of hydraulic fluid in said pump, said control means having at least one signal transmitting output connected with said regulating means and at least one second input arranged to receive from said regulating means signals denoting the condition of said regulating means, said regulating means comprising first means for adjusting said first fluid flow varying device and second means for adjusting said second fluid flow varying device.

28. The drive of claim 27, wherein at least one of said devices comprises a tiltable wobble plate.

29. The drive of claim 27, further comprising means for transmitting motion between said adjusting means and the respective devices, said control means comprising discrete outputs for transmission of signals to said first and second adjusting means.

30. The drive of claim 29, wherein said first and second adjusting means are connected to each other only by way of said control means.

* * * * *